US005501389A

United States Patent [19]
Muth et al.

[11] Patent Number: 5,501,389
[45] Date of Patent: Mar. 26, 1996

[54] TITANIUM TUBE SEAL WELDING HEAD ENCLOSURE

[75] Inventors: Dorel Muth, Kitchener; Dennis McGuinness, Cambridge, both of Canada

[73] Assignee: The Babcock & Wilcox Company, New Orleans, La.

[21] Appl. No.: 194,953

[22] Filed: Feb. 14, 1994

[51] Int. Cl.$^6$ ..................................... B23K 9/00
[52] U.S. Cl. ..................... 228/29; 219/60.2; 219/121.2
[58] Field of Search ..................... 228/29, 183, 219, 228/262.71; 249/60.2, 121.2, 121.22, 121.11, 125.11

[56] References Cited

U.S. PATENT DOCUMENTS

| | | | |
|---|---|---|---|
| 2,908,805 | 10/1959 | Apblett et al. | 219/60.2 |
| 3,601,248 | 8/1971 | Gerard | 219/121.22 |
| 3,806,693 | 4/1974 | Miller | 219/121.22 |

FOREIGN PATENT DOCUMENTS 2263062  10/1975  France ..................................... 228/29

OTHER PUBLICATIONS

*Welding Design & Fabrication*, "At Last, A Good Way to Back-purge Piping", Stocker, R. P., Oct. 1973, p. 53.
*Titanium Welding Techniques*, Titanium Engineering Bulletin, No. 6, Mar. 1960, pp. 7–12 and FIG. 4.

*Primary Examiner*—P. Austin Bradley
*Assistant Examiner*—Jeanne M. Elpel
*Attorney, Agent, or Firm*—Daniel S. Kalka; Robert J. Edwards

[57] ABSTRACT

An arrangement for providing a seal fillet weld on a titanium tube sheet and tube includes an enclosure having a closed top and an open bottom opposite the top. The enclosure is positioned over the tubes to be welded on the tube sheet. A rotating seal welding head is contained within the enclosure for performing the welding operation on the tube and tube sheet. Trapped air is purged from the enclosure and inert gas is provided to the enclosure for creating an inert gas atmosphere for facilitating the welding operation. A rubber gasket is used to seal the enclosure to the tube sheet for ensuring a sealed inert atmosphere.

9 Claims, 3 Drawing Sheets

TITANIUM TUBE SEAL WELDING HEAD ENCLOSURE

BACKGROUND OF THE INVENTION

1. Field of the Invention

The present invention relates in general to welding and in particular to a new and useful system and method of welding titanium tubes.

2. Description of the Related Art

In the power plant field, the manufacture of steam generators requires that the heat tubes are welded to a tube sheet. Although many different types of metals and alloys are used during plant construction, the use of titanium tubes welded to a titanium clad tube sheet has not been provided using fillet welds. When performing welding operations on titanium alloys, it is necessary to maintain an inert atmosphere because titanium oxidizes rapidly in the presence of oxygen at high temperatures.

Because of the rapid oxidation problem associated with welding titanium, presently, there is no known system for performing welding operations on titanium tubes and titanium tube sheets using fillet welds.

SUMMARY OF THE INVENTION

The present invention pertains to an arrangement and method for performing a fillet welding operation on a titanium tube and titanium sheet. The arrangement according to the present invention comprises an enclosure having a closed top and an open bottom opposite the top which is positioned on the tube sheet at the bottom of the enclosure. A rotating seal welding head is provided within the enclosure for providing a sealed weld at the tube and tube sheet. The enclosure is made of a transparent material such as plexiglass for viewing the seal-welding operation.

Trapped air inside the enclosure is purged from the enclosure and the enclosure is filled with an inert gas such as argon. A rubber gasket is used at the bottom of the enclosure to seal the enclosure to the tube sheet; and the enclosure is clamped to the tube sheet for facilitating the welding operation.

Each tube which is subjected to welding is plugged with a felt plug and a gas purge line is used to provide argon directly to the tube.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
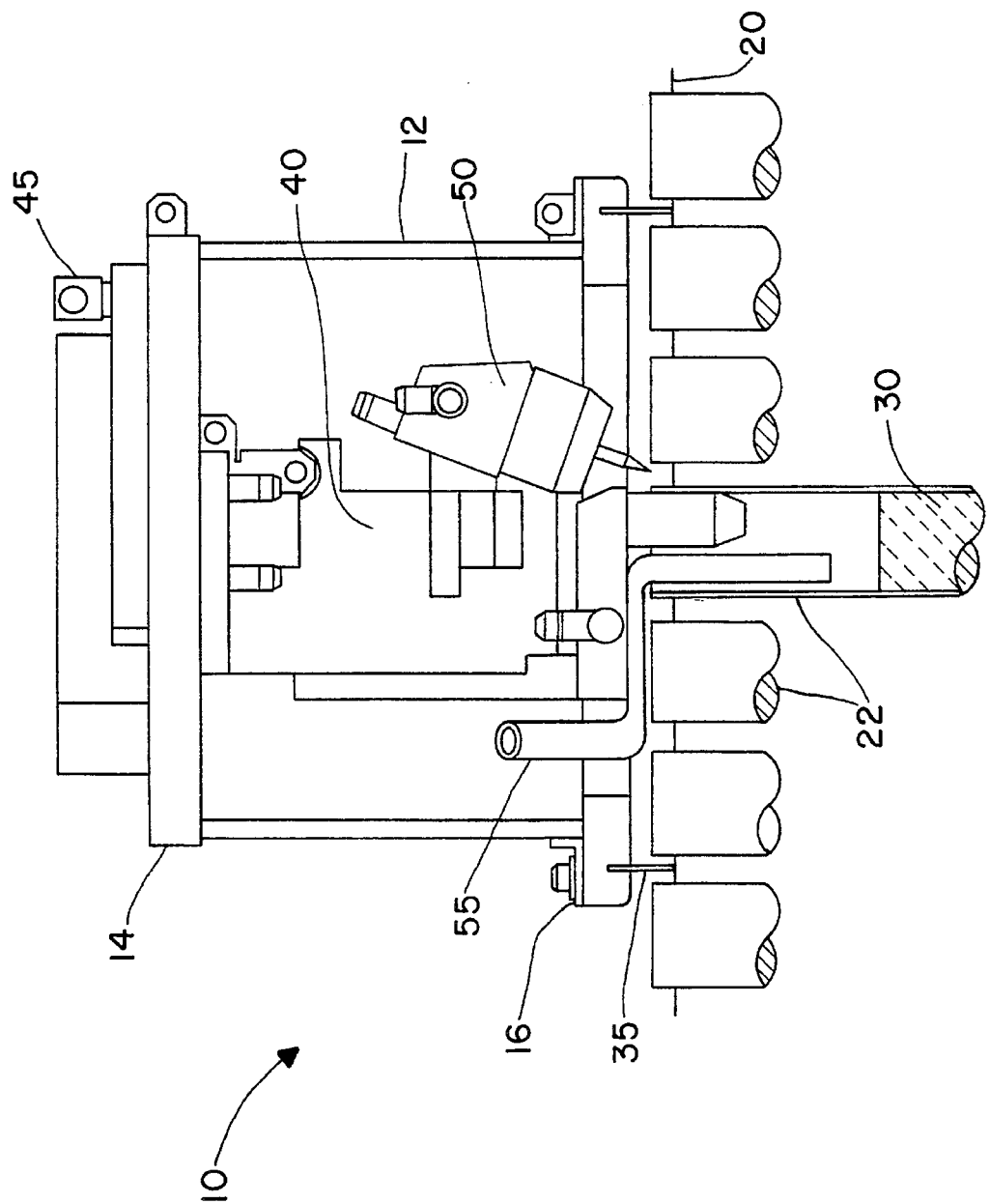
FIG. 1 is a schematic view illustrating an arrangement according to the present invention.

According to the present invention, as shown in FIG. 1, the seal weld arrangement, generally designated 10, comprises an enclosure 12 which is made of a transparent thermal plastic material such as plexiglass. The enclosure 12 is preferably cylindrical-shaped.

The cylinder 12 has a top clamp plate 14 which forms a closed top of the arrangement 10 and an open bottom 16 in the form of a bottom clamp plate. The enclosure 12 is clamped to a tube sheet 20 which can be titanium or a titanium alloy, for facilitating the welding of tubes 22, also of the same material, to the tube sheet 20. A rubber gasket 35 is used to seal the enclosure 12 at the bottom of the enclosure 12 and is located between the bottom clamp plate 16 and the tube sheet 20.

Generally, the tubes 22 to be welded project approximately $3/16$ inches through the tube sheet 20. A rotating welding head 40 having a tungsten electrode with gas supply means 50 are provided within the enclosure 12 for providing a seal weld around the outside diameter of the tube 22 extending through the tube sheet 20. The welding head 40 rotates around the tubes 22 to be welded to the tube sheet 20 which are located within the confines of the cylinder 12 clamped to the tube sheet 20.

Prior to performing a seal weld operation, felt plugs 30 are inserted in the tubes 22 to a depth of about 2 inches in the tubes 22. The felt plugs 30 are used for those tubes 22 which are to be welded to the tube sheet 20 and located within the confines of the enclosure 12. By completing sealing the tubes 22 and the enclosure 12 to the tube sheet 20, trapped air inside the enclosure 12 is purged from the enclosure 12 through a purging and gas supply means 45, which provides a fast prepurge and shielding gas supply for the enclosure 12. Trapped air within the enclosure 12 is purged from the enclosure 12 by an inert gas such as argon through the gas supply 45. Additionally, a second gas line 55 provides argon gas directly to the tube 22 to be welded.

Figure 3:
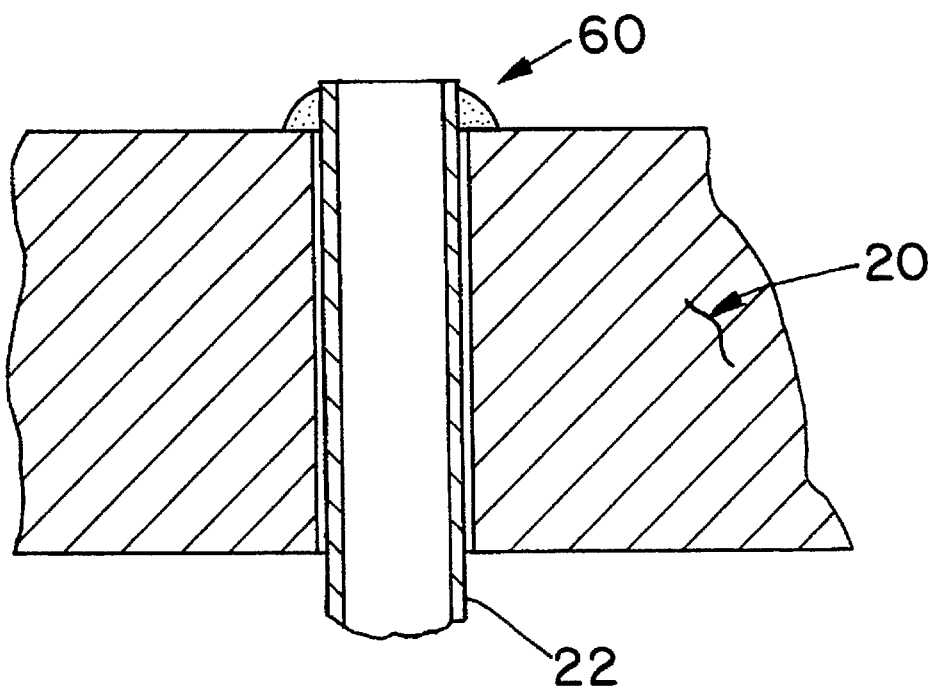
FIG. 3 is a view in cross-section of a tube sheet, tube and weld.

After clamping the enclosure 12 to the tube sheet 20, the enclosure 12 is purged of air for approximately 1 minute prior to providing a seal weld 60 as shown in FIG. 3. This purging time allows for the air trapped within the enclosure 12 to be driven out of the enclosure 12 and for the entire volume of air to be replaced with argon. After the purging, the fillet seal weld 60 (FIG. 3) is performed. Then, the enclosure 12 is purged for approximately 30 more seconds in order to ensure that the temperature of the tubes 22 has dropped to acceptable levels for ensuring a proper weld.

Figure 2:
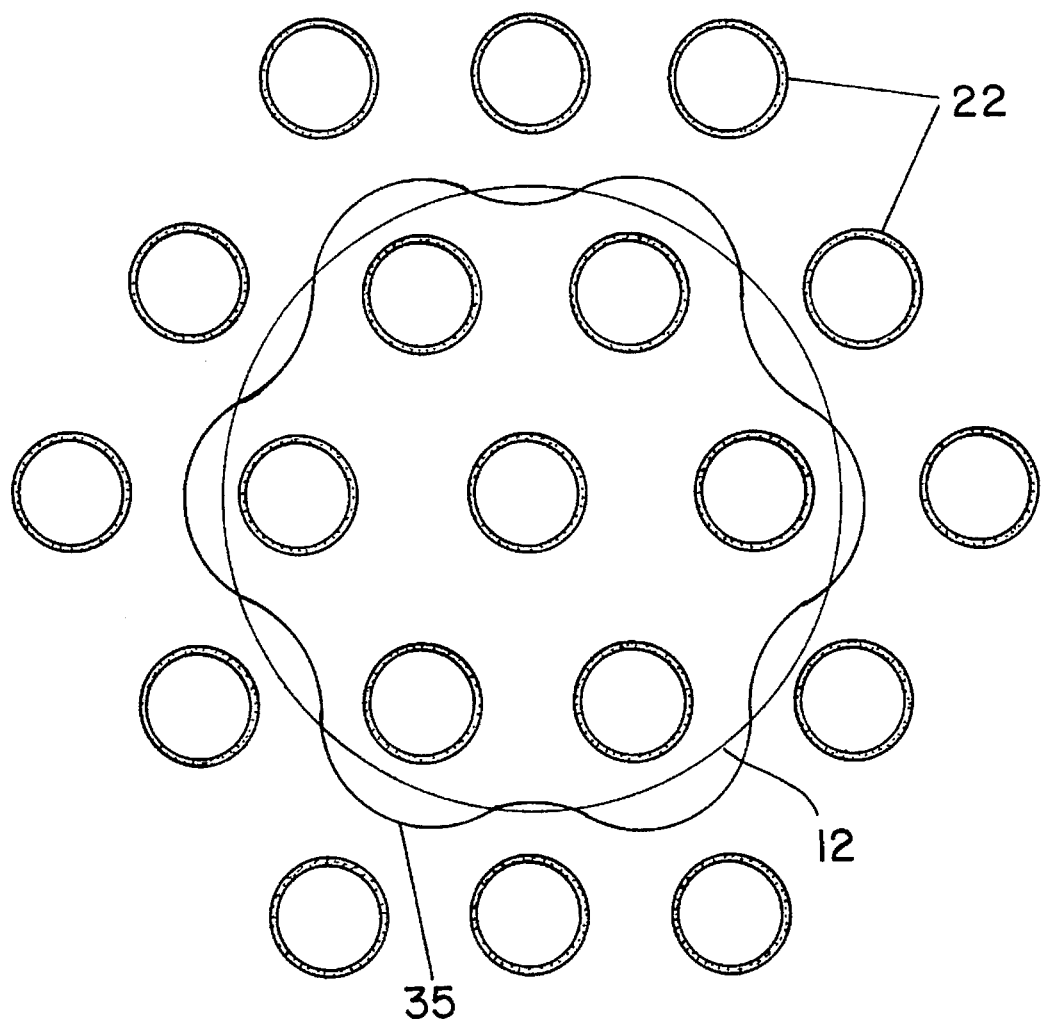
FIG. 2 is a bottom plan view of the arrangement of FIG. 1.

As shown in FIG. 1, the tube shielding gas purge line 55 provides additional argon to the enclosure 12 and directly to the tube 22 to be welded in order to increase the purge rate for the arrangement 10. FIG. 2 shows tubes 22 confined within the perimeter of enclosure 12 and the gasket seal 35 which ensures a completely sealed and secured environment of argon gas for ensuring a proper welding.

When welding titanium alloys, it is necessary to maintain an inert atmosphere. The present invention ensures a proper inert atmosphere is maintained in a relatively inexpensive manner. The present invention comprises seal welding units 40 and 50, which are known, and incorporated into the present invention. Due to the configuration of the present invention, very little size is added to existing seal welding units which are used. The transparency of the enclosure 12 allows an operator to continuously monitor the seal welding process.

While specific embodiments of the invention have been shown and described in detail to illustrate the application of the principles of the invention, it will be understood that the invention may be embodied otherwise without departing from such principles.

What is claimed is:

1. An arrangement for providing a weld on a material, comprising:

an enclosure having a closed top and an open bottom opposite the top, the enclosure being positioned on the material at the bottom, said bottom of said enclosure having means for sealing said enclosure to the material and for preventing oxidation of the material, said enclosure being made of a transparent thermoplastic material;

a rotating welding head including an electrode and gas supply means within the enclosure for performing a welding operation on the material; and inert gas means for providing an inert gas atmosphere within the enclosure.

2. The arrangement according to claim 1, wherein the transparent material is plexiglass.

3. The arrangement according to claim 1, wherein the open bottom of the enclosure includes an open plate.

4. The arrangement according to claim 3, wherein the sealing means further includes a profiled gasket between the open plate and the material.

5. The arrangement according to claim 1, wherein the enclosure is cylindrical-shaped.

6. The arrangement according to claim 1, wherein the electrode and gas supply means comprise a tungsten electrode.

7. The arrangement according to claim 1, wherein the inert gas means comprises a purging means for purging air trapped within the enclosure.

8. The arrangement according to claim 7, wherein the inert gas provided to the enclosure is argon.

9. The arrangement according to claim 8, wherein the inert gas means further comprises an additional gas line.

* * * * *